US007416675B2

(12) United States Patent
Shim et al.

(10) Patent No.: US 7,416,675 B2
(45) Date of Patent: Aug. 26, 2008

(54) METHOD OF FABRICATING INKJET PRINT HEADS

(75) Inventors: Dong-sik Shim, Suwon-si (KR); Hyung Choi, Seongnam-si (KR); Yong-seop Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 11/453,012

(22) Filed: Jun. 15, 2006

(65) Prior Publication Data

US 2007/0126772 A1 Jun. 7, 2007

(30) Foreign Application Priority Data

Dec. 6, 2005 (KR) ...................... 10-2005-0118334

(51) Int. Cl.
*G01D 15/00* (2006.01)

(52) U.S. Cl. ............................ 216/27; 216/27; 216/37; 216/56; 216/67; 347/20; 347/40; 347/50

(58) Field of Classification Search .................. 216/27; 347/40
See application file for complete search history.

(56) References Cited

U.S. PATENT DOCUMENTS

| | | | | |
|---|---|---|---|---|
| 4,392,907 | A * | 7/1983 | Shirato et al. | 156/252 |
| 5,880,762 | A * | 3/1999 | Ishinaga et al. | 347/62 |
| 2005/0206677 | A1 * | 9/2005 | Silverbrook | 347/40 |
| 2007/0268327 | A9 * | 11/2007 | Silverbrook | 347/20 |

* cited by examiner

*Primary Examiner*—Shamim Ahmed
*Assistant Examiner*—Maki Angadi
(74) *Attorney, Agent, or Firm*—Stanzion & Kim, LLP

(57) ABSTRACT

A method of fabricating inkjet print heads usable in an ink jet printer. The method of fabricating ink jet print heads includes preparing a plurality of ink jet print heads on a wafer while forming sub sidewalls around the ink jet print heads when the ink jet print heads are being prepared, attaching protection films onto the sub sidewalls of the wafer and the ink jet print heads, and dicing the ink jet print heads and detaching the individual ink jet print heads from the wafer. In the method, the ink jet print heads are diced in a wafer unit. Particularly, connect pads of the ink jet print heads can be prevented from being contaminated by the protection films.

24 Claims, 12 Drawing Sheets

METHOD OF FABRICATING INKJET PRINT HEADS

CROSS-REFERENCE TO RELATED APPLICATIONS

This application claims the benefit under 35 U.S.C. § 119 of Korean Patent Application No. 2005-118334, filed on Dec. 6, 2005, the entire content of which is incorporated herein by reference.

BACKGROUND OF THE INVENTION

1. Field of the Invention

The present general inventive concept relates to a method of fabricating a print head usable in an inkjet printer.

2. Description of the Related Art

Generally, an inkjet printer makes little noise, provides excellent resolution, and realizes color at a low cost. In this respect, demand for the inkjet printer has been rapidly increasing. The inkjet printer prints images by ejecting (i.e., jetting) liquid ink through a nozzle using a print head. With the development and advancement of semiconductor technology, technology used to manufacture a print head, which is a main part of the ink jet printer, has been actively developed for several years. As a result, a print head, which is provided with about three hundred nozzles and provides a resolution of 1200 dpi (dots-per-inch), can be manufactured and mounted in an ink cartridge.

Various methods for ejecting ink from the inkjet print head to a sheet of paper have been developed. Generally, a heat transfer ink jet method is employed in which a heating layer generates heat to form bubbles in an ink chamber containing the ink, thereby ejecting ink though one or more of the nozzles.

FIG. 1A is a front sectional view illustrating a conventional ink jet print head 10, and FIG. 1B is a plane view illustrating the conventional ink jet print head 10. FIG. 1A illustrates a section taken along line A-A of the conventional ink jet print head 10 of FIG. 1B. As illustrated in FIGS. 1A and 1B, the conventional ink jet print head 10 has a deposition structure in which a substrate 11*a*, a heating layer 12, an electrode layer 13, a passivation layer 14, and an anti-cavitation layer 15 are sequentially deposited.

The electrode layer 13 is formed on the heating layer 12, and receives an electrical signal from a typical CMOS logic (not shown) and a typical power transistor (not shown) to transmit the electrical signal to the heating layer 12. The passivation layer 14 and the anti-cavitation layer 15 are formed on the heating layer 12 and the electrode layer 13 to protect the heating layer 12 and the electrode layer 13. The passivation layer 14 electrically insulates the heating layer 12 and the electrode layer 13 and protects the heating layer 12 and the electrode layer 13 from external impact. The anti-cavitation layer 15 prevents the heating layer 12 from being damaged by a cavitation force generated when ink bubbles generated in ink by heat energy disappear.

The ink is supplied from a lower surface of the substrate 11*a* of the print head 10 to an upper surface of the substrate 11*a* through an ink supply path 16. The ink supplied through the ink supply path 16 reaches an ink chamber 17 formed by a chamber plate 19 having ink nozzles 19*a* and 19*b* formed therein. The ink temporarily accumulated in the ink chamber 17 is instantaneously heated by heat generated by the heating layer 12. The heating layer 12 generates heat by receiving the electrical signal through the electrode layer 13 that is connected with a connect pad 18. The connect pad 18 is coupled to an external circuit. The ink generates explosive bubbles. Some of the ink in the ink chamber 17 is discharged from the print head 10 through the ink nozzles 19*a* and 19*b* due to an ejection force provide by the generated bubbles. The ink nozzles 19*a* and 19*b* are formed in the chamber plate 19 disposed on the ink chamber 17.

Various research efforts relating to a method for fabricating the ink jet print head 10 in one wafer unit have been undertaken. This method will be described with reference to FIGS. 2 and 3.

FIG. 2 is a perspective view illustrating a wafer 11 provided with a plurality of ink jet print heads 10 and 10' (i.e., an ink jet print head array), and FIG. 3 is a sectional view taken along line B-B of the wafer 11. For description purposes, only two ink jet print heads 10 and 10' are illustrated.

Referring to FIGS. 2 and 3, heating layers 12 and 12', electrode layers 13 and 13', passivation layers 14 and 14', and anti-cavitation layers 15 and 15' are sequentially formed on the wafer 11 (i.e., substrates 11*a* and 11*a*, respectively). Next, after a positive photoresist mold (not shown) is formed on the passivation layers 14 and 14', a negative photoresist (i.e., a photosensitive epoxy resin) is coated on a whole surface of the wafer 11. The negative photoresist undergoes UV exposure through a photo mask (not shown) provided with a nozzle pattern and then a portion other than a portion hardened by UV exposure (i.e., a portion corresponding to the nozzle pattern) is removed using a developer. As a result, chamber plates 19 and 19' provided with nozzles 19*a*, 19*b*, 19*a*', and 19*b*' are formed on the substrates 11*a* and 11*a*'. After the chamber plates 19 and 19' are fabricated, ink supply paths 16 and 16' are formed on a bottom of the wafer 11 (i.e., through the substrates 11*a* and 11*a*', respectively) by etching. Then, the positive photoresist mold is removed using a solvent, thereby forming ink chambers 17 and 17' in the chamber plates 19 and 19', respectively.

Next, the wafer 11 is diced in order to respectively obtain the ink jet print heads 10 and 10' from the wafer 11 having the plurality of ink jet print head arrays 10 and 10' fabricated thereon. In order to prevent inner portions of the ink jet print heads 10 and 10' from being contaminated when the wafer 11 is diced, protection films 31 and 32 are attached to both surfaces of the wafer 11, and then the wafer 11 is diced along a dashed line of FIG. 2 (see an arrow of FIG. 3).

In the dicing process of the wafer 11, the protection films 31 and 32 can prevent the inner portions of the ink chambers 17 and 17' of the ink jet print heads 10 and 10' from being contaminated. However, since a distance between the ink jet print heads 10 and 10' adjacent to each other is long in view of the structure of the ink jet print heads 10 and 10', a portion F of the protection film 31 sags. For this reason, the dicing process of the wafer 11 is undesirably performed. For example, the protection film 31 may be difficult to dice, since the protection film 31 is not supported properly. This may cause the dicing process to be performed unevenly. Additionally, in the dicing process, since the connect pads 18 and 18' outside the ink jet print heads 10 and 10', respectively, are exposed outside of the protection films 31 and 32, the connect pads 18 and 18' can be seriously contaminated.

SUMMARY OF THE INVENTION

Accordingly, the present general inventive concept provides a method of fabricating inkjet print heads, in which connect pads are prevented from being contaminated when the inkjet print heads are diced in a wafer unit.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a method of fabricating ink jet print heads including preparing a plurality of ink jet print heads on a wafer while forming sub sidewalls around the ink jet print heads when the ink jet print heads are being prepared, attaching protection films onto the sub sidewalls of the wafer and the ink jet print heads, and dicing the ink jet print heads and detaching the individual ink jet print heads from the wafer.

The preparing of the plurality of ink jet print heads may include sequentially forming insulating layers, heating layers, electrode layers, passivation layers, and anti-cavitation layers on a first surface of the wafer, forming chamber sidewalls on the passivation layers to define ink chambers where nozzles are to be formed, forming sacrificing layers in the chamber sidewalls, forming chamber plates on the chamber sidewalls and sacrificing layers, forming the nozzles by etching portions of the chamber plates, forming ink supply paths by etching a second surface of the wafer opposite to the first surface of the wafer, and removing the sacrificing layers.

The preparing of the plurality of ink jet heads may further include forming connect pads adjacent to the ink jet print heads by patterning the electrode layers.

The forming of the sub sidewalls around the ink jet print heads may include sequentially forming a first plating layer for the chamber sidewalls and a second plating layer for the chamber plates on the passivation layers and patterning the first and second plating layers.

The sub sidewalls may be formed adjacent to the connect pads of the ink jet print heads.

The sub sidewalls may be formed to have the same height as a height of the chamber plates of the ink jet print heads.

The protection films may be attached onto the sub sidewalls and the print heads using an additive. The protection films are coated with the additive on one surface.

The dicing of the ink jet print heads may include dicing a portion between the sub sidewalls to detach the print heads from the wafer.

The insulating layers may be thermal storage layers.

Furthermore, the preparing of the plurality of ink jet heads may include sequentially forming insulating layers, heating layers, electrode layers, passivation layers, and anti-cavitation layers on a first surface of the wafer, forming sacrificing layers on the passivation layers and removing the sacrificing layers to leave a portion that defines ink chambers with corresponding nozzles, forming nozzle molds on the remaining sacrificing layers to define the nozzles and forming chamber plating layers on the nozzles molds and the remaining sacrificing layers, forming ink supply paths by etching a second surface of the wafer opposite to the first surface of the wafer, forming the nozzles by removing the nozzle molds, and removing the sacrificing layers. In this case, the sub sidewalls may be formed by pattering the chamber plating layers on the passivation layers.

The forming of the chamber plating layers may include forming plating seed layers on the remaining sacrificing layers at a portion that defines the ink chambers and corresponds to the nozzles, forming the nozzle molds on the plating seed layers to define the nozzles, and forming the chamber plating layers on the plating seed layers and the nozzle molds. In this case, the sub sidewalls may be formed by pattering the plating seed layers and the chamber plating layers on the passivation layers.

The sub sidewalls may be formed to have the same height as a height of the chamber plating layers.

The foregoing and/or other aspects of the present general inventive concept are also achieved by providing a method of fabricating an ink jet print head on a wafer, the method including forming an ink flow structure having a plurality of different layers by performing a plurality of depositing operations and a plurality of patterning operations of the layers on the substrate such that a plurality of sidewalls are formed on the substrate during the depositing and patterning operations, attaching a protection film on upper surfaces of the sidewalls, and separating the ink jet print head from the wafer by dicing along an outside portion of at least one of the sidewalls.

The foregoing and/or other aspects of the present general inventive concept are also achieved by providing a method of fabricating ink jet heads on a wafer, the method including sequentially forming a plurality of layers on a substrate, each layer having a structure portion to define parts of an ink flow structure and wall portions to define sidewalls on both sides of the structure portion, and attaching a protection film on the ink flow structure and the sidewalls.

The foregoing and/or other aspects of the present general inventive concept are also achieved by providing a method of fabricating semiconductor chips on a wafer, the method including sequentially forming a plurality of layers on a substrate, each layer having a structure portion to define parts of a device structure and wall portions to define sidewalls on both sides of the structure portion, and attaching a protection film on the device structure and the sidewalls.

The foregoing and/or other aspects of the present general inventive concept are also achieved by providing a wafer, including a plurality of substrates, a plurality of ink jet heads formed on the plurality of substrates, a plurality of sidewalls extending from the substrates to divide the ink jet heads, and a protection film disposed on the sidewalls to protect the ink jet heads and isolate the ink jet heads from each other.

The foregoing and/or other aspects of the present general inventive concept are also achieved by providing a wafer, including at least one substrate, at least one print head formed on the substrate having an ink flow structure disposed on the substrate and having an ink chamber and a chamber plate disposed above the ink chamber with a plurality of nozzles formed therein, and at least one connect pad disposed on the substrate adjacent to the ink flow structure, a pair of sidewalls disposed on the substrate on opposite sides of the at least one print head, and a protection film disposed on the pair of sidewalls and the chamber plate and extending over the at least one print head.

The foregoing and/or other aspects of the present general inventive concept are also achieved by providing an ink jet print head, including an ink flow structure disposed on a substrate and having a predetermined height, and first and second sidewalls disposed on the substrate on first and second sides of the ink flow structure and having the predetermined height.

The foregoing and/or other aspects of the present general inventive concept are also achieved by providing a wafer, including a plurality of substrates, a plurality of device structures formed on the plurality of substrates, a plurality of sidewalls extending from the substrates to divide the device structures, and a protection film disposed on the sidewalls to protect the device structures and isolate the device structures from each other.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
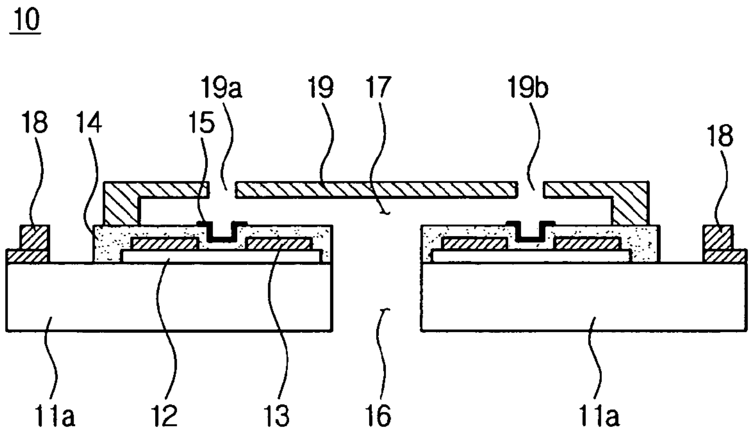
FIG. 1A (PRIOR ART)
FIG. 1A is a front sectional view illustrating a conventional ink jet print head.
Figure 1B:
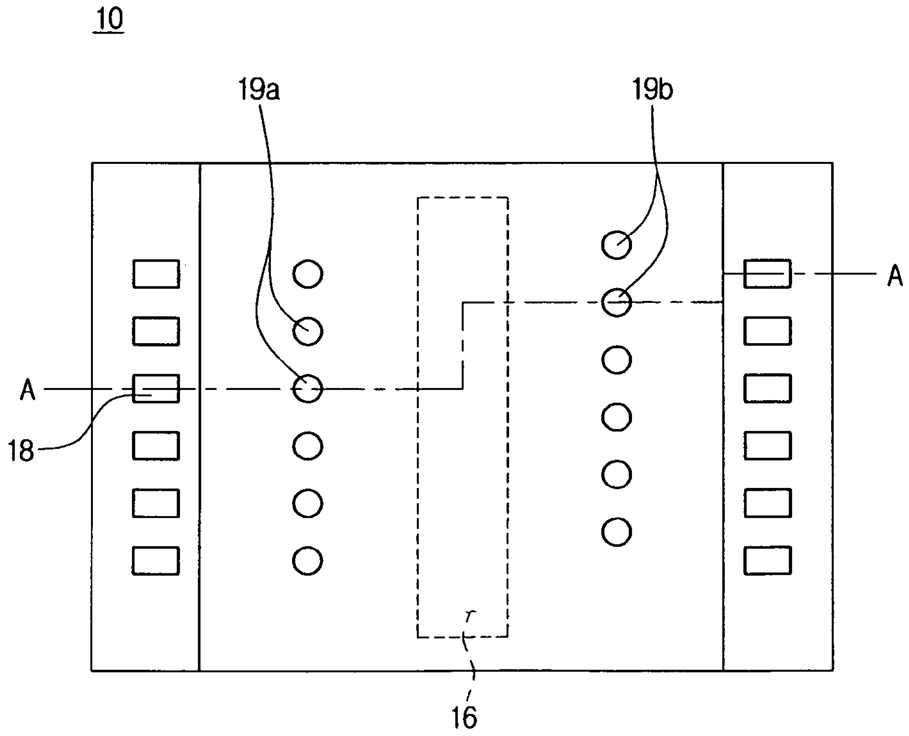
FIG. 1B (PRIOR ART)
FIG. 1B is a plane view illustrating the conventional ink jet print head of FIG. 1A.
Figure 2:
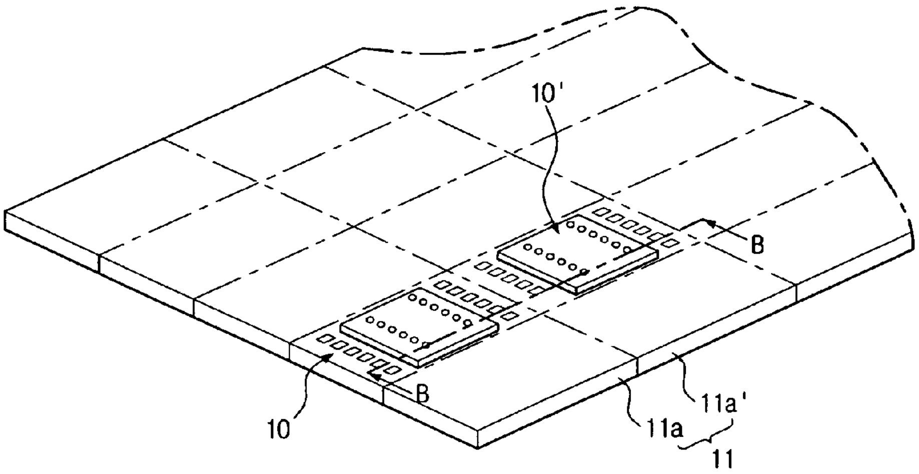
FIG. 2 (PRIOR ART)
FIG. 2 is a partial perspective view illustrating a wafer of an ink jet print head to explain a conventional method of fabricating a chip having an ink jet print head.
Figure 3:
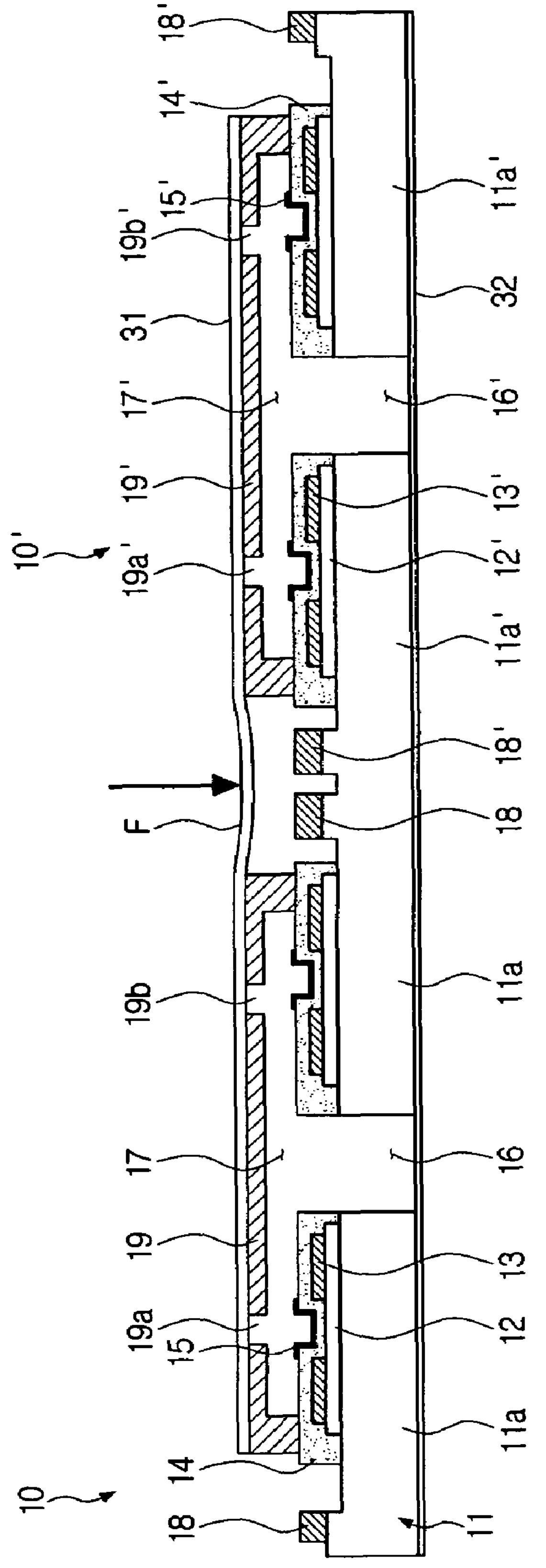
FIG. 3 (PRIOR ART)
FIG. 3 is a sectional view taken along line B-B of the wafer of FIG. 2.

Reference will now be made in detail to the preferred embodiments of the present general inventive concept, examples of which are illustrated in the accompanying drawings, wherein like reference numerals refer to the like elements throughout. The embodiments are described below in order to explain the present general inventive concept by referring to the figures.

Figure 4:
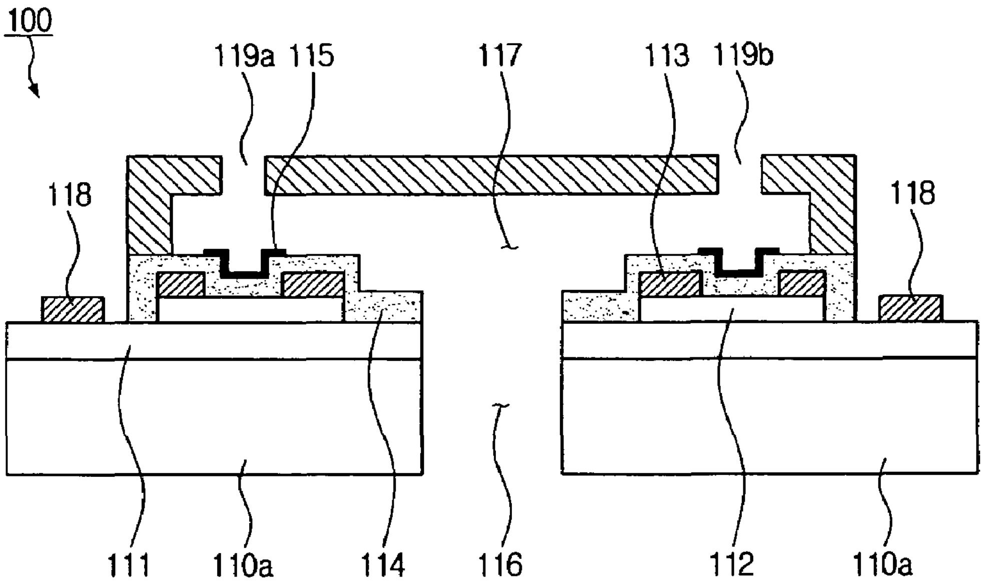
FIG. 4 is a sectional view illustrating an ink jet print head according to an embodiment of the present general inventive concept.

FIG. 4 is a sectional view illustrating an ink jet print head 100 according to an embodiment of the present general inventive concept. Referring to FIG. 4, the ink jet print head 100 is a heat transfer ink jet print head that ejects ink upward and includes a substrate 110*a*, a heating layer 112, an electrode layer 113, and a passivation layer 114.

A silicon wafer may be used as the substrate 110*a*.

The heating layer 112 may be a thin film heater formed on the substrate 110*a*, and converts an electrical signal transmitted from the electrode layer 113 into heat energy so as to generate heat to instantaneously heat the ink. The heating layer 112 may be formed of a metal material such as Ta—Al, TaN, and Ta—Al—Si, and may be a resistor or a thin film resistor.

The electrode layer 113 is formed on the heating layer 112, and transmits the electrical signal received from a CMOS logic component (or the like) and a power transistor to the heating layer 112. The electrode layer 113 may be formed of a highly conductive material such as Al, Au, Ta, and Pt.

A thermal storage layer 111 may be formed between the heating layer 112 and the substrate 110*a*. The thermal storage layer 111 acts as an insulating layer and may be polysilicon.

The passivation layer 114 is formed to contact the heating layer 112 and the electrode layer 113. The passivation layer 114 electrically insulates the heating layer 112 and the electrode layer 113 and protects the heating layer 112 and the electrode layer 113 from external impact. The passivation layer 114 may be formed of SiNx or SiOx having good insulation efficiency and good heat transfer efficiency.

An anti-cavitation layer 115 may be formed on a portion of the passivation layer 114 corresponding to where nozzles 119*a* and 119*b* are formed. The anti-cavitation layer 115 prevents the heating layer 112 from being damaged by a cavitation force generated when ink bubbles generated by the heat energy disappear.

An ink chamber 117 is formed on a structure including the substrate 110*a*, the heating layer 112, the electrode layer 113, and the passivation layer 114. Nozzles 119*a* and 119*b* are provided above the ink chamber 117. An ink supply path 116 is provided below the ink chamber 117. The ink is supplied from a lower surface of the substrate 110*a* of the print head 100 to an upper surface of the substrate 110*a* through the ink supply path 116. The ink supplied through the ink supply path 116 reaches the ink chamber 117. The ink temporarily accumulated in the ink chamber 117 is instantaneously heated by the heat energy generated by the heating layer 112. The heating layer 112 generates heat by receiving the electrical signal through the electrode layer 113 connected with a connect pad 118. The connect pad 118 is coupled to an external circuit. The ink generates explosive bubbles when heated by the heating layer 112. Some of the ink in the ink chamber 117 is discharged from the print head 100 through the ink nozzles 119*a* and 119*b* due to the generated bubbles.

The ink jet print head 100 may be fabricated using various methods. In a method of fabricating ink jet print heads, which will be described later, the connect pad 118 can be prevented from being contaminated when the ink jet print head 100 is fabricated in a wafer unit with other ink jet print heads. The ink jet print head 100 may be a device structure (e.g., a layered device structure) formed on the wafer 110.

Hereinafter, the method of fabricating ink jet print heads according to an embodiment of the present general inventive concept will be described in detail with reference to the accompanying drawings.

FIG. 5A to FIG. 5I are sectional views illustrating a method of fabricating the ink jet print head 100 according to an embodiment of the present general inventive concept. For description purposes, only two ink jet print heads 100 and 100' adjacent to each other on a wafer 110 are illustrated in FIGS. 5A to 5I. However, it should be understood that more than two ink jet print heads can be fabricated on the wafer 110.

Referring to FIGS. 5A to 5I, the method of fabricating the ink jet print heads 100 and 100' according to the present embodiment includes preparing a plurality of the ink jet print heads 100 and 100' on the wafer 110, forming sub sidewalls 121 and 121' around the ink jet print heads 100 and 100' when the ink jet print heads 100 and 100' are being prepared (i.e., during the same processes that are performed to fabricate the ink jet heads 100 and 100'), attaching a protection film 131 (i.e., an upper protection film) onto the sub sidewalls 121 and 121' of the wafer 110 and the ink jet print heads 100 and 100', and respectively dicing the ink jet print heads 100 and 100' and detaching the individual ink jet print heads 100 and 100' from the wafer 110. The method may further include attaching a protection film 132 (i.e., a lower protection film) to the wafer 110. In other words, the sub sidewalls 121 and 121' are formed layer by layer according to layers being deposited to form the ink jet print heads 100 and 100'.

As illustrated in FIG. 5A to FIG. 5E, the insulating layers 111 and 111', the heating layers 112 and 112', the electrode layers 113 and 113', the passivation layers 114 and 114', and the anti-cavitation layers 115 and 115' are sequentially formed on the wafer 110, which includes the substrates 110*a* and 110*a'*.

Figure 5A:
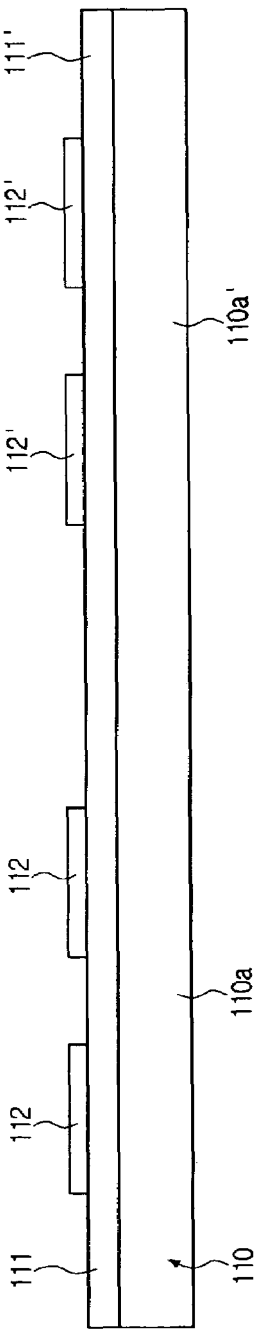
FIG. 5A to FIG. 5I are sectional views illustrating a method of fabricating ink jet print heads according to an embodiment of the present general inventive concept.

As illustrated in FIG. 5A, the insulating layers 111 and 111' can be formed such that a polysilicon layer is newly formed or doped on the wafer 110. The insulating layers 111 and 111' may be thermal storage layers that prevent heat generated from the heating layers 112 and 112' from being transferred to the substrates 110*a* and 110*a'*.

Figure 5B:
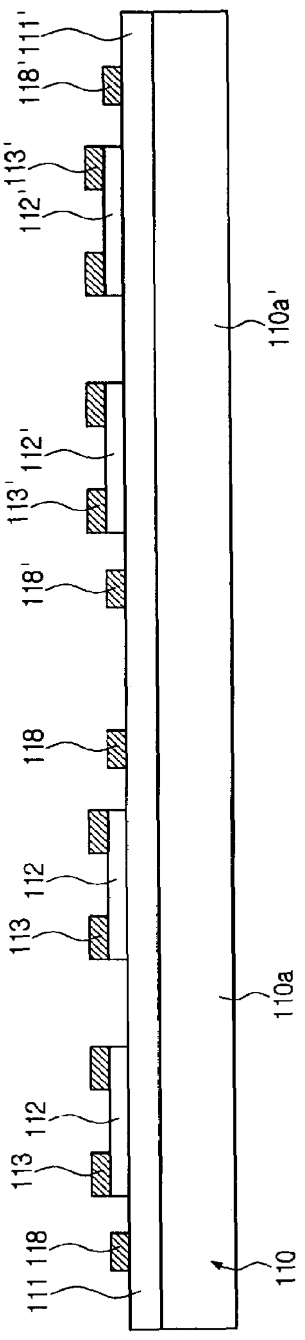

As illustrated in FIG. 5B, the heating layers 112 and 112' can be formed such that a conductive metal, such as Ta—Al, TaN, and Ta—Al—Si, is deposited and then patterned.

Next, the electrode layers 113 and 113' are deposited on the wafer 110 provided with the heating layers 112 and 112', and a portion that corresponds to the nozzles 119*a* and 119*b* is patterned by etching. When the electrode layers 113 and 113' are formed, the electrode layers may be patterned to form the connect pads 118 and 118' next to the ink jet print heads 100 and 100'. The connect pads 118 and 118' are connected with external terminals when the ink jet print heads 100 and 100' are used.

Figure 5C:
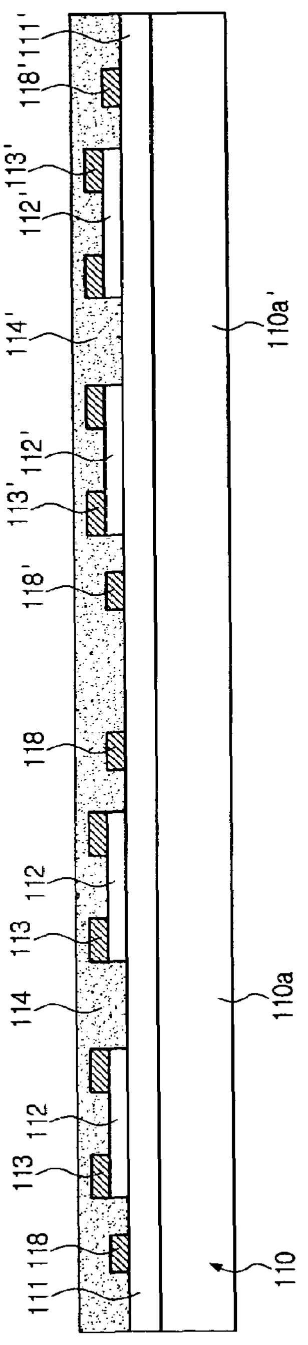
Figure 5D:
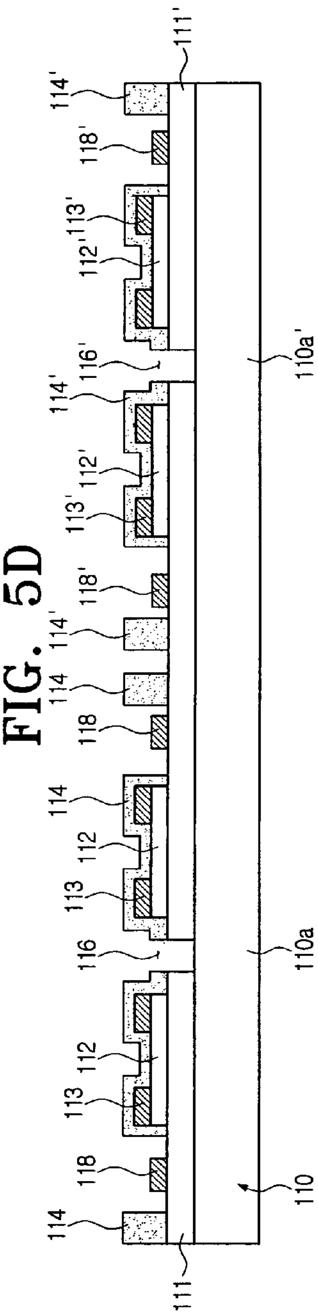

As illustrated in FIG. 5C and FIG. 5D, the passivation layers 114 and 114' can be formed such that a material having good insulation efficiency and good heat transfer efficiency (SiNx or SiOx) is deposited on the wafer 110 having the electrode layers 113 and 113' and the heating layers 112 and 112' disposed thereon, and then the material is patterned. When patterns for the passivation layers 114 and 114' are formed, the insulating layers 111 and 111' are etched to prepare a portion for the ink supply paths 116 and 116'.

Figure 5E:
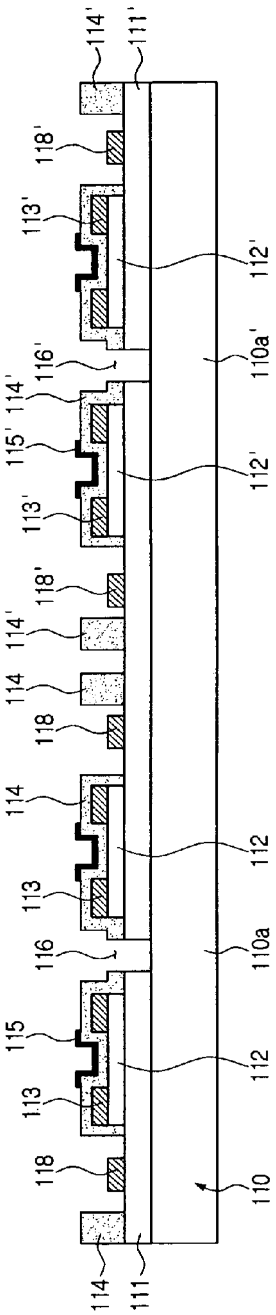

As illustrated in FIG. 5E, the anti-cavitation layers 115 and 115' can be formed on the passivation layers 114 and 114' by deposition and patterning.

Figure 5F:
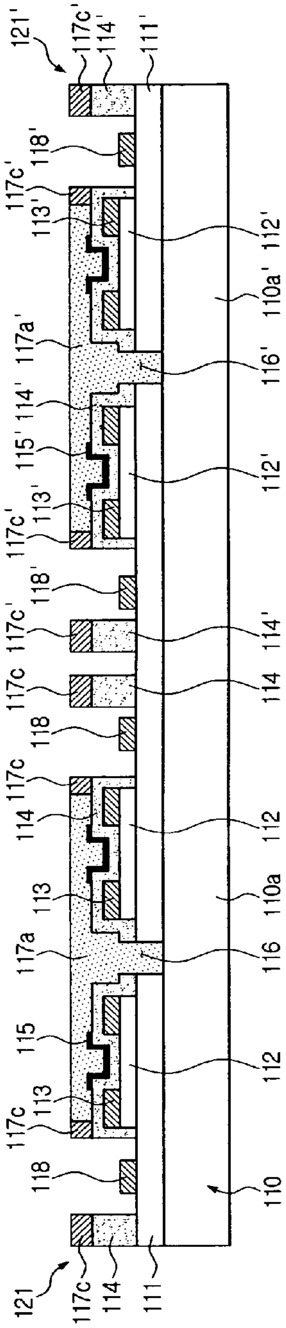

Then, as illustrated in FIG. 5F, chamber sidewalls 117*c* and 117*c'* are formed on the passivation layers 114 and 114' at portions at which the sub sidewalls 121 and 121' are to be formed and portions that are to define the ink chambers 117 and 117". The chamber sidewalls 117*c* and 117*c'* can be formed by depositing a metal plating layer and patterning the deposited metal plating layer to leave the chamber sidewalls 117*c* and 117*c'*. Sacrificing layers 117*a* and 117*a'* are deposited and then patterned to leave them inside the chamber sidewalls 117*c* and 117*c'* (i.e., in a portion that is to correspond to the ink chambers 117 and 117').

Figure 5G:
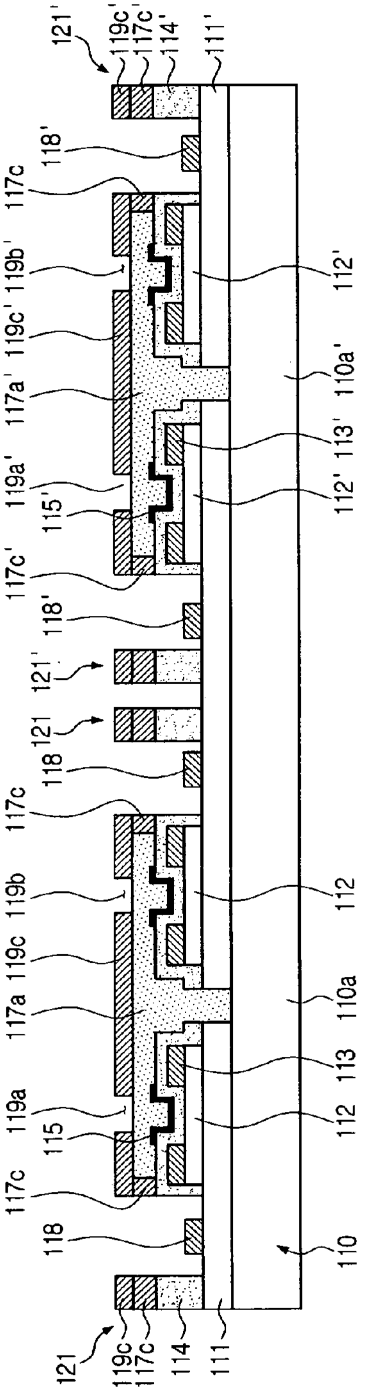

Next, as illustrated in FIG. 5G, chamber plates 119*c* and 119*c'* are formed by deposition or plating on the sacrificing layers 117*a* and 117*a'*, which are disposed inside the chamber sidewalls 117*c* and 117*c'*. Portions of the chamber plates 119*c* and 119*c'* are etched to form the nozzles 119*a*, 119*b*, 119*a'*, and 119*b'*.

Figure 5H:
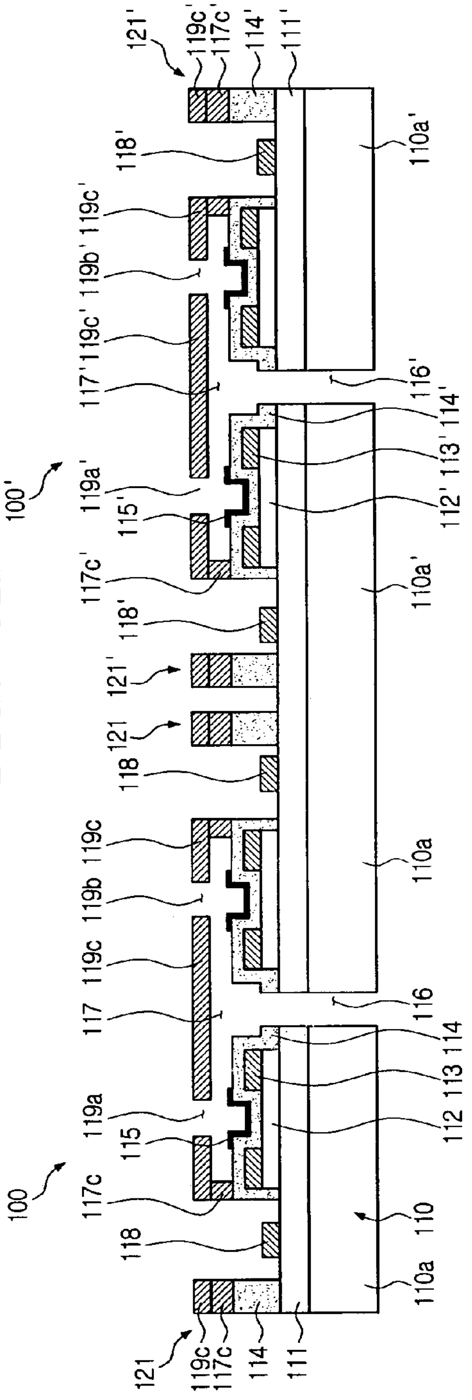

As illustrated in FIG. 5H, a bottom surface of the wafer 110 (i.e., a surface opposite to where the nozzles 119*a*, 119*b*, 119*a'*, and 119*b'* are formed) is etched to form the ink supply paths 116 and 116'. The sacrificing layers 117*a* and 117*a'* are then removed via the ink supply paths 116 and 116'.

Meanwhile, the sub sidewalls 121 and 121' are formed at sides of the ink jet print heads 100 and 100' on the wafer 110. The sub sidewalls 121 and 121' are formed adjacent to the connect pads 118 and 118' of the ink jet print heads 100 and 100'. More specifically, the sub sidewalls 121 and 121' are formed outside the connect pads 118 and 118' with respect to the ink jet heads 100 and 100'. Additionally, the sub sidewalls 121 and 121' are formed at a height that is equal to a height of the ink jet print heads 100 and 100'. For example, in the ink jet print heads 100 and 100' of the present embodiment, the sub sidewalls 121 and 121' have the same height as that of the chamber plates 119*c* and 119*c'*. In other words, in the method of fabricating the ink jet print heads 100 and 100', the sub sidewalls 121 and 121' are formed by the passivation layers 114 and 114', the chamber sidewalls 117*c* and 117*c'* and the chamber plates 119*c* and 119*c'* to have the same height as that of the ink jet print heads 100 and 100'. Therefore, in the present embodiment of the sub sidewalls 121 and 121' are formed sequentially by the plating and patterning of the layer of the chamber sidewalls 117*c* and 117*c'* and the plating and the patterning of the layer of the chamber plates 119*c* and 119*c'* on the passivation layers 114 and 114'. The ink supply paths 116 and 116', the ink chambers 117 and 117', the nozzles 119*a*, 119*b*, 119*a'*, and 119*b'*, and/or defining layers can collectively form an ink flow structure.

Figure 5I:
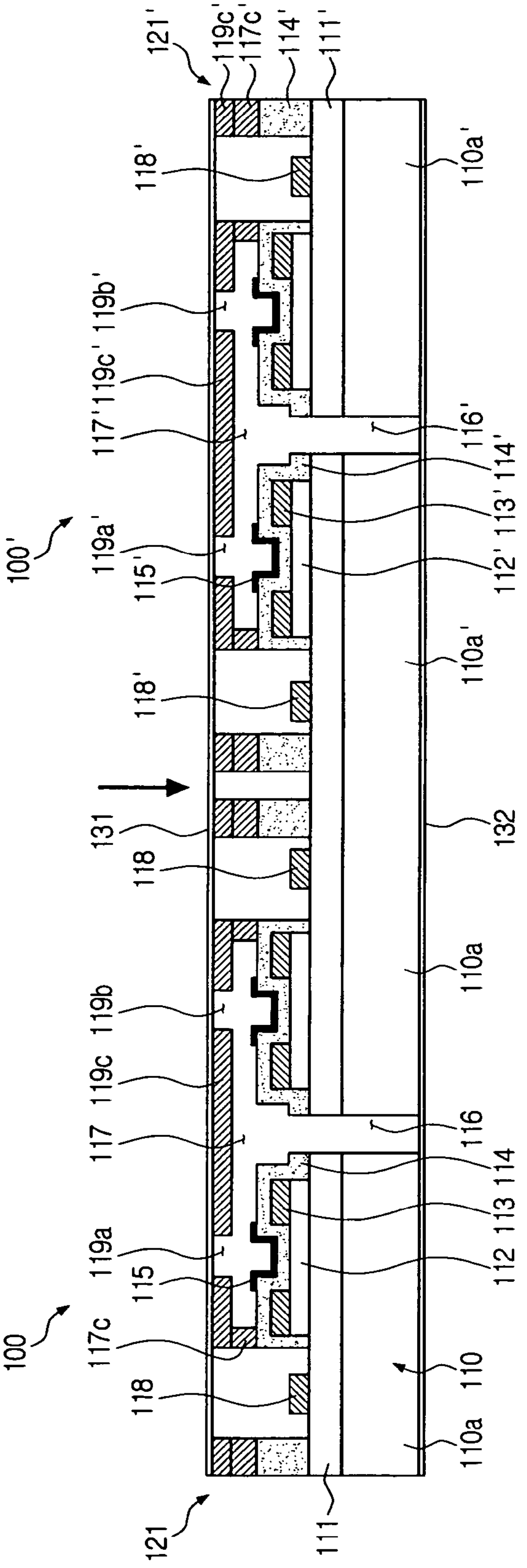

Next, as illustrated in FIG. 5I, the protection films 131 and 132 (i.e., the upper and lower protection films, respectively) are attached to both surfaces of the wafer 110 provided with the ink jet print heads 100 and 100' having the sub sidewalls 121 and 121'. As can be seen from FIG. 5I, a pair of the sub sidewalls 121 and 121' enclose each of the ink jet print heads 100 and 100'. When the protection film 131 is attached onto the wafer 110, the protection film 131 is attached onto the sub sidewalls 121 and 121' and the chamber plates 119*c* and 119*c'* of the wafer 110. Accordingly, an additive may be coated on one surface of each protection film 131 and 132, or the protection films 131 and 132 may be formed of an additive material. In the present embodiment, the additive is coated on one surface of each protection film 131 and 132. Each of the ink jet print heads 100 and 100' is diced from the wafer 110 to detach them from the wafer 110. As illustrated in FIG. 5I, the ink jet print heads 100 and 100' are detached from the wafer 110 by dicing the portion between the sub sidewalls 121 and 121' along the downward arrow. In the ink jet print heads 100 and 100' fabricated as above, the connect pads 118 and 118' as well as insides of the ink chambers 117 and 117' are not contaminated. Since the adjacent sub sidewalls 121 and 121' (i.e., inner sub sidewalls) disposed at a common boundary between the two adjacent ink jet heads 100 and 100' are disposed relatively close together, the adjacent sub sidewalls 121 and 121' can effectively support the protection film 131, when the protection film 131 is diced. Accordingly, the protection film 131 and the wafer 110 can be easily diced.

Hereinafter, a method of fabricating ink jet print heads according to the another embodiment of the present general inventive concept will be described in detail with reference to the accompanying drawings.

Similar to the previous embodiment, the method of fabricating the ink jet print heads according to the present embodiment includes preparing a plurality of ink jet print heads 200 and 200' in a wafer 210, forming sub sidewalls 221 and 221' around the ink jet print heads 200 and 200' when the ink jet print heads are being prepared 200 and 200' (i.e., during the same processes performed to prepare the ink jet print heads 200 and 200'), attaching protection films 231 onto the sub sidewalls 221 and 221' of the wafer 210 and the ink jet print heads 200 and 200', and respectively dicing the ink jet print heads 200 and 200' and detaching the individual ink jet print heads 200 and 200' from the wafer 210. In the present embodiment, the ink jet print heads 200 and 200' can be fabricated in a manner different from that of the previous embodiment.

FIG. 6A to FIG. 6H are sectional views illustrating the method for fabricating the ink jet print heads 200 and 200' according to the present embodiment. The method of the present embodiment is different from the method of the previous embodiment in processes of fabricating nozzles 219*a*, 219*b*, 219*a'*, and 219*b'* and ink chambers 217 and 217'. For illustration purposes, the reference numbers of FIG. 6A to FIG. 6H are set to correspond to the reference numbers of FIG. 5A to FIG. 5I. Accordingly, the processes and operations of the present embodiment that are different from those of the previous embodiment will be described while a description of other process and operations that are similar will not be provided.

In the method of fabricating the ink jet print heads 200 and 200' according to the present embodiment, insulating layers 211 and 211', heating layers 212 and 212', electrode layers 213 and 213', passivation layers 214 and 214', and anti-cavitation layers 215 and 215' are sequentially formed on the wafer 210 in a similar manner as in the previous embodiment.

Figure 6A:
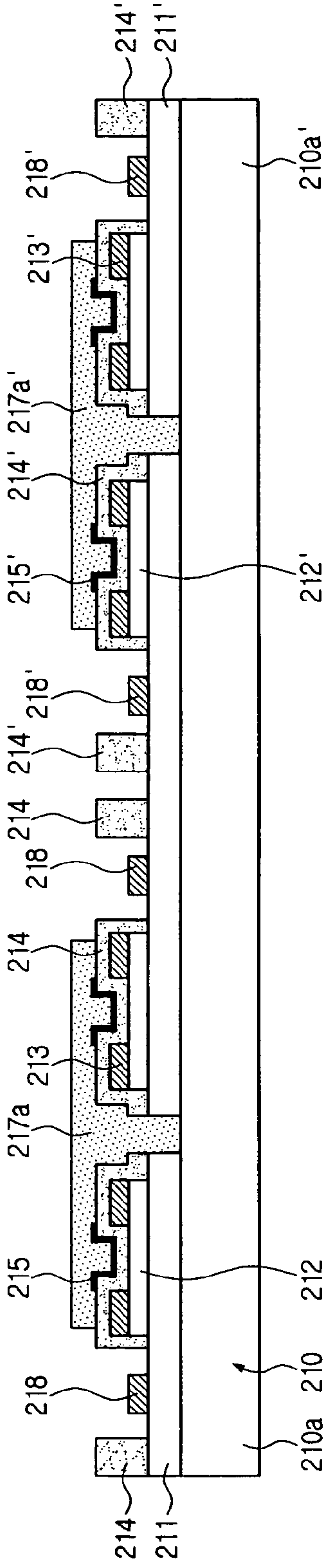
FIG. 6A to FIG. 6H are sectional views illustrating a method of fabricating ink jet print heads according to another embodiment of the present general inventive concept.
Figure 6B:
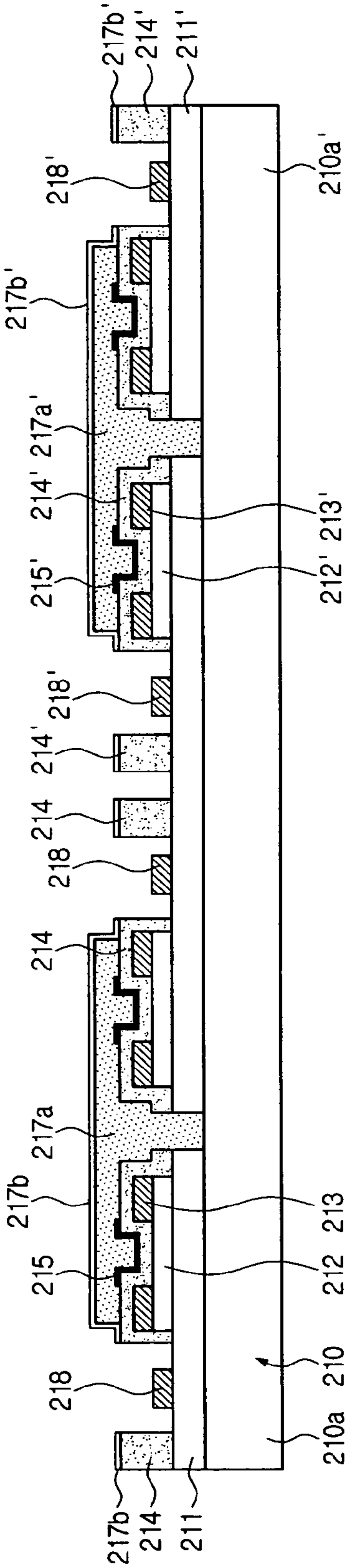

Then, as illustrated in FIG. 6A, sacrificing layers 217*a* and 217*a*' are formed on the passivation layers 214 and 214' where the nozzles 219*a*, 219*b*, 219*a*', and 219*b*' and the ink chambers 217 and 217' will be formed. As illustrated in FIG. 6B, seed layers 217*b* and 217*b*' are formed on the passivation layers 214 and 214' and the sacrificing layers 217*a* and 217*a*' by electroless plating or deposition. The seed layers 217*b* and 217*b*' can be formed at a portion where the ink chambers 217 and 217' and the nozzles 219*a*, 219*b*, 219*a*', and 219*b*' are to be formed, and at a portion where the sidewalls 221 and 221' are to be formed.

Figure 6C:
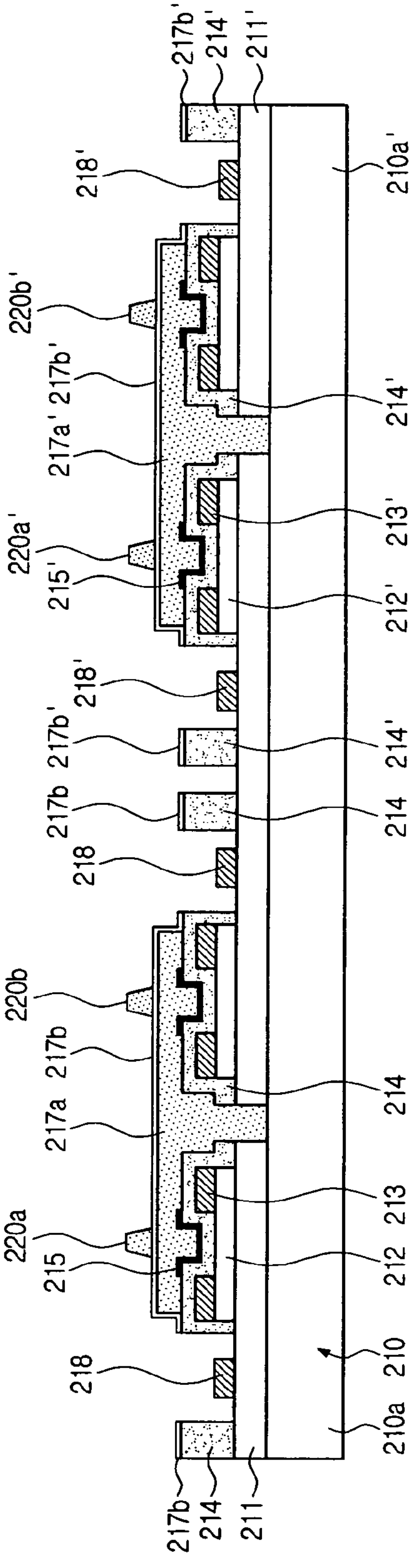

Next, as illustrated in FIG. 6C, nozzle molds 220*a*, 220*b*, 220*a*', and 220*b*' are formed to define the nozzles 219*a*, 219*b*, 219*a*', and 219*b*' on the seed layers 217*b* and 217*b*'. Alternatively, the seed layers 217*b* and 217*b*' need not be formed, and instead the nozzle molds 220*a*, 220*b*, 220*a*', and 220*b*' can be formed on remaining sacrificing layers 217*a* and 217*a*'.

Figure 6D:
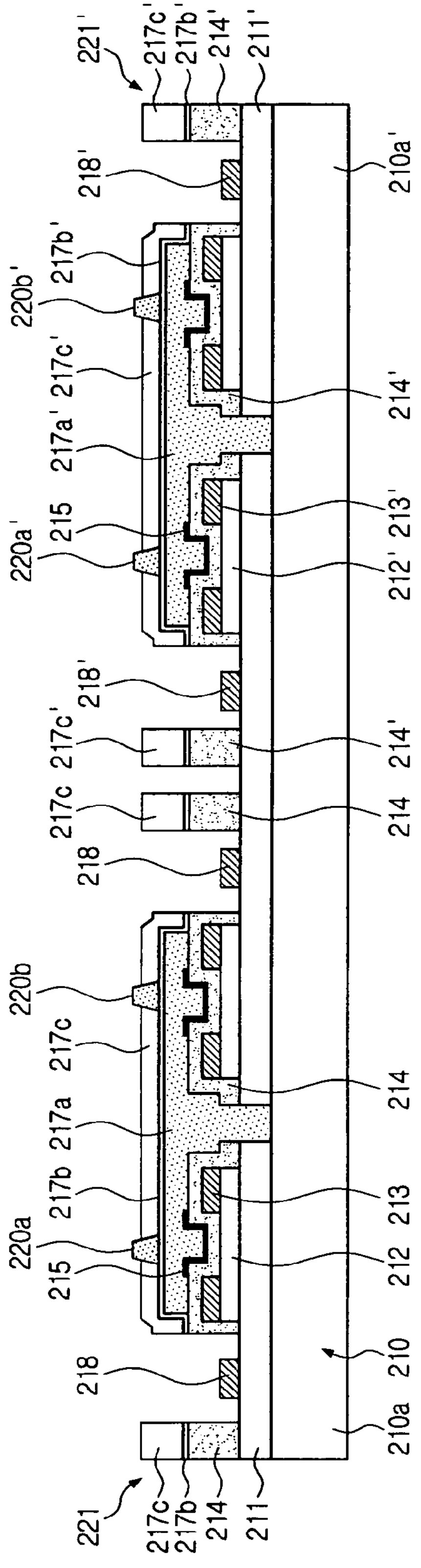

As illustrated in FIG. 6D, chamber plating layers 217*c* and 217*c*' are formed on the sacrificing layers 217*a* and 217*a*' and/or the seed layers 217*b* and 217*b*'. As illustrated in FIG. 6B, the seed layers 217*b* and 217*b*' may be formed before the chamber plating layers 217*c* and 217*c*' are formed on the sacrificing layers 217*a* and 217*a*'. The nozzle molds 220*a*, 220*b*, 220*a*', and 220*b*' may be formed of the same material as that of the sacrificing layers 217*a* and 217*a*'.

Figure 6E:
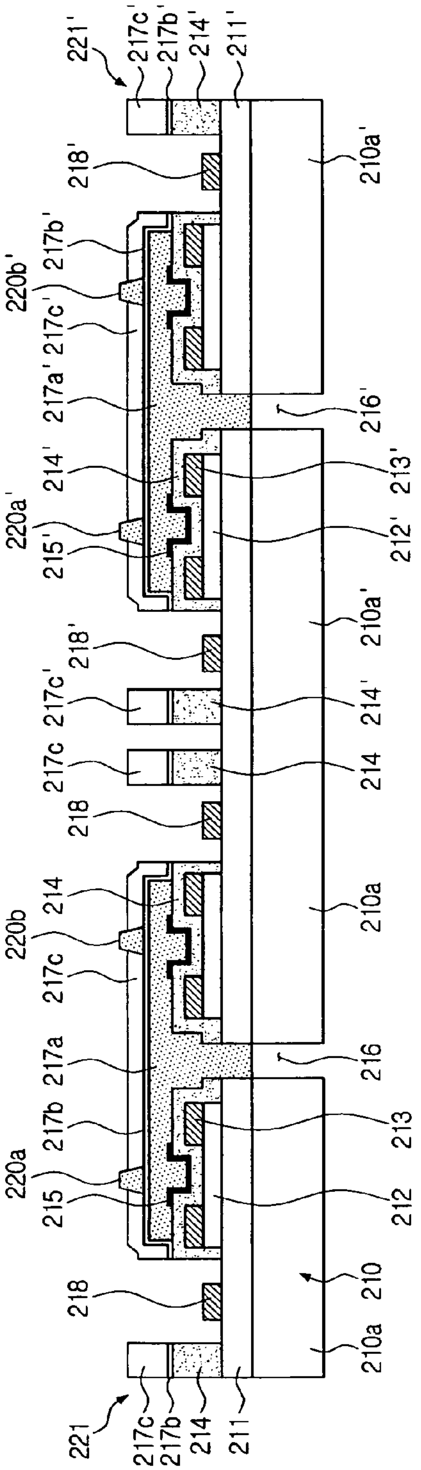
Figure 6F:
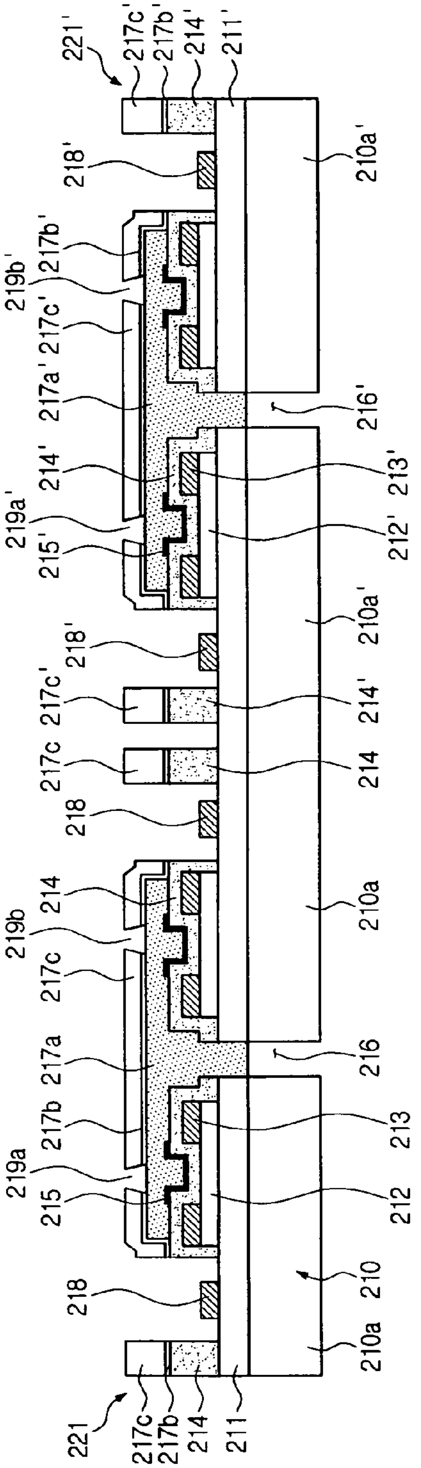
Figure 6G:
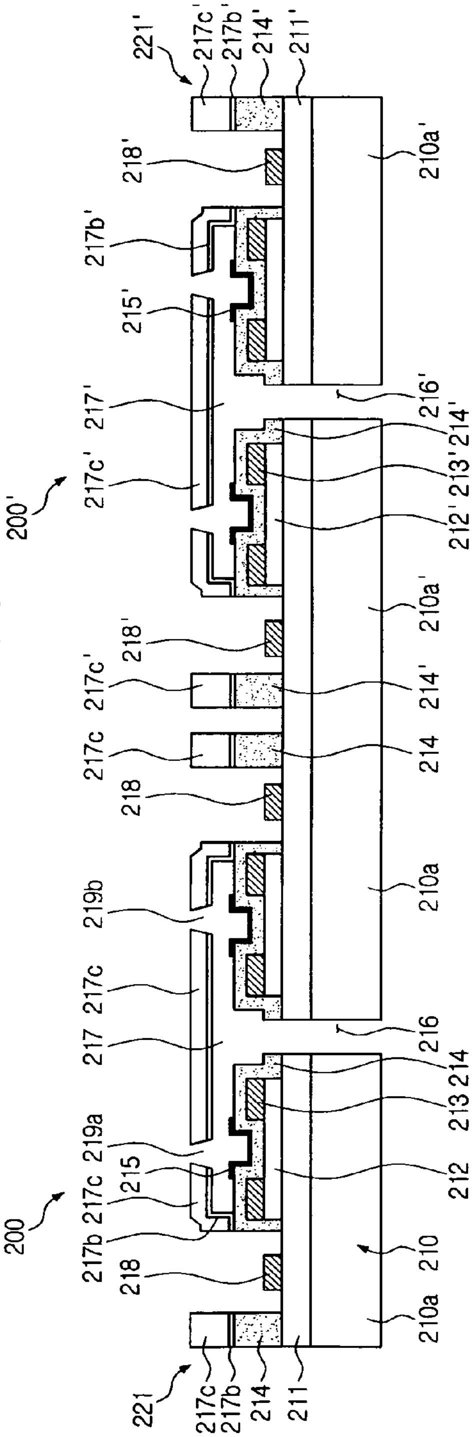

As illustrated in FIG. 6E, a bottom surface of the wafer 210 (i.e., opposite to where the chamber plating layers 217*c* and 217*c*' are formed) is etched to form ink supply paths 216 and 216'. As illustrated in FIG. 6F, the nozzle molds 220*a*, 220*b*, 220*a*', and 220*b*' are then removed to form the nozzles 219*a*, 219*b*, 219*a*', and 219*b*'. When the sacrificing layers 217*a* and 217*a*' are removed as illustrated in FIG. 6G, the ink jet print heads 200 and 200' are fabricated on the wafer 210.

The sub sidewalls 221 and 221' are formed at sides of the ink jet print heads 200 and 200' on the wafer 210 during the process and operations of fabricating various layers. In the method of fabricating the ink jet print heads 200 and 200' according to the present embodiment, the sub sidewalls 221 and 221' are formed by the passivation layers 214 and 214', the chamber plating layers 217*c* and 217*c*', and the seed layers 217*b* and 217*b*'. In this case, the sub sidewalls 221 and 221' have the same height as that of the ink jet print heads 200 and 200'. Therefore, in the present embodiment, the sub sidewalls 221 and 221' are formed such that the seed layers 217*b* and 217*b*' and the chamber plating layers 217*c* and 217*c*' for the ink chambers 217 and 217' are sequentially formed on the passivation layers 214 and 214' and then patterned.

Figure 6H:
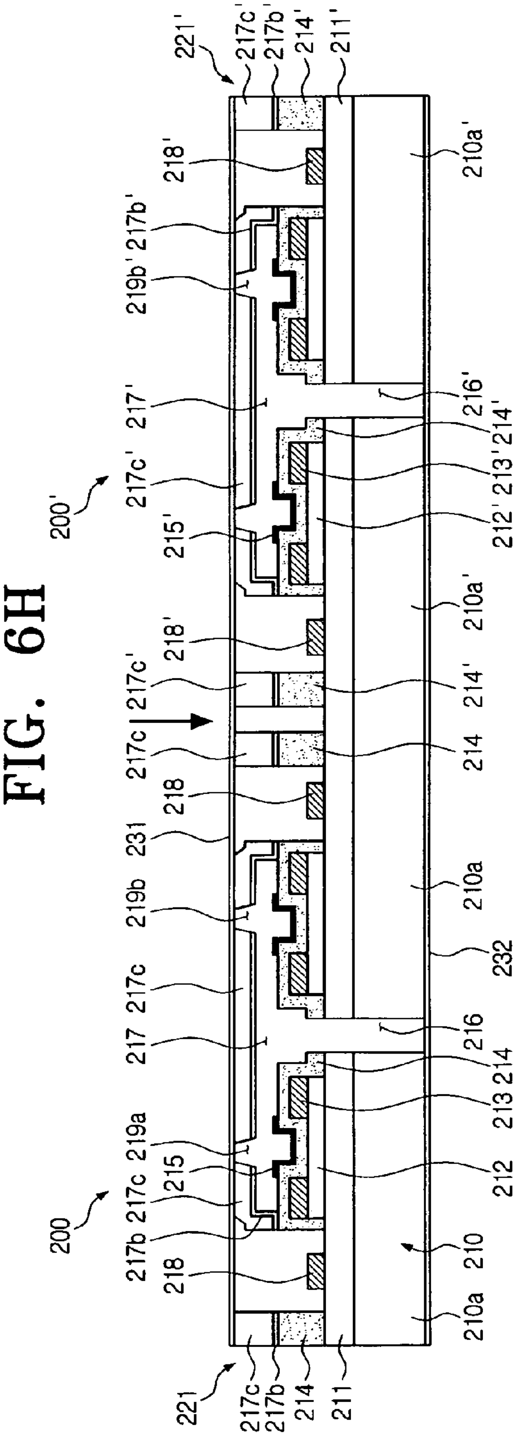

Next, as illustrated in FIG. 6H, the protection films 231 and 232 are attached to both surfaces of the wafer 210 provided with the ink jet print heads 200 and 200' having the sub sidewalls 221 and 221'. The ink jet print heads 200 and 200' are detached from the wafer 210 in a similar manner as in the previous embodiment. In the ink jet print heads 200 and 200' fabricated as described above, the connect pads 218 and 218' as well as the inside of the ink chambers 217 and 217' are not contaminated. Since the adjacent sub sidewalls 221 and 221' (i.e., inner sub sidewalls) disposed at a common boundary between the two adjacent ink jet heads 200 and 200' are disposed relatively close together, the adjacent sub sidewalls 221 and 221' can effectively support the protection film 231, when the protection film 231 is diced. Accordingly, the protection film 231 and the wafer 210 can be easily diced.

Referring to FIGS. 5I and 6H, the sidewalls 121 and 121' or 221 and 221' may subsequently be removed along with the protection films 131 and 132 or 231 and 232, once the ink jet print heads 100 and 100' or 200 and 200' are detached from the wafer 110 or 210. Accordingly, the ink jet print head 100 of FIG. 4 or a similar ink jet print head can be obtained.

As described above, in a method of fabricating ink jet print heads according to various embodiments of the present general inventive concept, the ink jet print heads are diced in a wafer unit. Particularly, connect pads of the ink jet print heads can be prevented from being contaminated. The dicing process of the embodiments of the present general inventive concept can be used in various methods of fabricating ink jet print heads.

Additionally, it should be understood that the embodiments of the present general inventive concept can be applied to other fabrication methods used to fabricate semiconductor chips other than ink jet print heads. For example, a chip having a layered device structure can be formed by deposition/plating and patterning operations while forming corresponding sidewalls. Once the device structure and the sub sidewalls are complete, a protection film can be disposed on the device structure and the sub sidewalls such that the device structure and corresponding connect pads are protected during a dicing process.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of fabricating ink jet print heads, the method comprising:

preparing a plurality of ink jet print heads on a wafer while forming sub sidewalls such that a pair of adjacent sub sidewalls is formed between each of the plurality of ink jet print heads that are being prepared;

attaching a protection film onto both an upper surface of the formed sub sidewalls and onto a lower surface of the wafer; and dicing the plurality of ink jet print heads and detaching individual ink jet print heads from the wafer.

2. The method as claimed in claim 1, wherein the preparing of the plurality of ink jet print heads comprises:

sequentially forming insulating layers, heating layers, electrode layers, passivation layers, and anti-cavitation layers on a first surface of the wafer;

forming chamber sidewalls on the passivation layers to define ink chambers where nozzles are to be formed;

forming sacrificing layers in the chamber sidewalls;

forming chamber plates on the chamber sidewalls and the sacrificing layers;

forming the nozzles by etching portions of the chamber plates;

forming ink supply paths by etching a second surface of the wafer opposite to the first surface of the wafer; and removing the sacrificing layers.

3. The method as claimed in claim 2, wherein the preparing of the plurality of ink jet print heads further comprises:

forming connect pads adjacent to the ink jet print heads by patterning the electrode layers.

4. The method as claimed in claim 2, wherein the forming of the sub sidewalls comprises:

sequentially forming a first plating layer for the chamber sidewalls and a second plating layer for the chamber plates on the passivation layers and patterning the first and second plating layers.

5. The method as claimed in claim 3, wherein the sub sidewalls are formed adjacent to the connect pads of the ink jet print heads.

6. The method as claimed in claim 2, wherein the sub sidewalls are formed to have a height that is the same as a height of the chamber plates of the ink jet print heads.

7. The method as claimed in claim 1, wherein the attaching of the protection film onto the sub sidewalls of the wafer and the ink jet print heads comprises:

attaching the protection film onto an upper surface of the sub sidewalls and onto a lower surface of the print heads using an additive.

8. The method as claimed in claim 7, wherein the protection film is coated with the additive on one surface of the film.

9. The method as claimed in claim 1, wherein the dicing of the ink jet print heads comprises:

dicing a portion of the wafer between adjacent sub sidewalls to detach the print heads from the wafer.

10. The method as claimed in claim 2, wherein the insulating layers comprise thermal storage layers.

11. The method as claimed in claim 1, wherein the preparing of the plurality of ink jet print heads comprises:

sequentially forming insulating layers, heating layers, electrode layers, passivation layers, and anti-cavitation layers on a first surface of the wafer;

forming sacrificing layers on the passivation layers and removing the sacrificing layers to leave a portion that defines ink chambers at which nozzles are to be formed;

forming nozzle molds on the remaining sacrificing layers to define the nozzles and forming chamber plating layers on the nozzle molds and the remaining sacrificing layers;

forming ink supply paths by etching a second surface of the wafer opposite to the first surface of the wafer;

forming the nozzles by removing the nozzle molds; and removing the sacrificing layers.

12. The method as claimed in claim 11, wherein the forming of the chamber plating layers comprises:

forming plating seed layers on the remaining sacrificing layers at a portion that defines the ink chambers and corresponds to the nozzles;

forming the nozzle molds on the plating seed layers to define the nozzles; and forming the chamber plating layers on the plating seed layers and the nozzle molds.

13. The method as claimed in claim 11, wherein the forming of the electrode layers comprises forming connect pads adjacent to the ink jet print heads by patterning the electrode layers.

14. The method as claimed in claim 11, wherein the forming of the sub sidewalls comprises patterning the chamber plating layers on the passivation layers.

15. The method as claimed in claim 12, wherein the forming of the sub sidewalls comprises patterning the plating seed layers and the chamber plating layers on the passivation layers.

16. The method as claimed in claim 13, wherein the forming of the sub sidewalls comprises forming the sub sidewalls adjacent to the connect pads of the ink jet print heads.

17. The method as claimed in claim 14, wherein the forming of the sub sidewalls comprises forming the sub sidewalls to have the same height as a height of the chamber plating layers.

18. The method as claimed in claim 15, wherein the forming of the sub sidewalls comprises forming the sub sidewalls to have the same height as a height of the chamber plating layers.

19. The method as claimed in claim 1, wherein the preparing of the plurality of ink jet print heads comprises performing a plurality of process operations and the sub sidewalls are formed during the same process operations.

20. A method of fabricating an ink jet print head on a wafer, the method comprising:

forming a plurality of ink flow structures on a substrate each having a plurality of different layers by performing a plurality of depositing operations and a plurality of patterning operations of the layers on the substrate such that a plurality of sidewalls are formed on the substrate during the depositing and patterning operations such that a pair of adjacent sidewalls is formed between each of the plurality of ink flow structures;

attaching a protection film on an upper surface of the sidewalls; and separating the plurality of the ink jet print structures from the wafer by dicing along an outside portion of each of the plurality of ink flow structures between a pair of adjacent sidewalls.

21. A method of fabricating ink jet heads on a wafer, the method comprising:

sequentially forming a plurality of layers on a substrate, each layer having a structure portion to define parts of a plurality of ink flow structures and wall portions to define sidewalls disposed between each of the plurality of ink flow structures such that a pair of adjacent sidewalls is disposed between each ink flow structure portion; and attaching a protection film to the plurality of ink flow structures and the sidewalls.

22. The method as claimed in claim 21, wherein the forming of the plurality of layers on the substrate comprises:

forming the plurality of ink flow structures on the substrate such that a contact pad is disposed between each pair of sidewalls and a nozzle of an adjacent ink flow structures.

23. The method as claimed in claim 22, further comprising:

separating the ink jet heads by dicing the wafer at portions between each of the pairs of adjacent sidewalls.

24. A method of fabricating semiconductor chips on a wafer, the method comprising:

sequentially forming a plurality of layers on a substrate, each layer having a structure portion to define parts of a device structure and wall portions to define sidewalls disposed on opposing sides of the structure portion such that a pair of adjacent sidewalls is formed on at least one side of the structure portion; and attaching a protection film to the device structure and the sidewalls.

* * * * *